(12) United States Patent
Chiang

(10) Patent No.: US 6,837,152 B1
(45) Date of Patent: Jan. 4, 2005

(54) WATER-COOLED MUFFLER DEVICE FOR A GRILL APPARATUS

(75) Inventor: Ting-Fang Chiang, Kaohsiung Hsien (TW)

(73) Assignee: Fancy Food Service Equipment Co., Ltd., Kaohsiung Hsien (TW)

( * ) Notice: Subject to any disclaimer, the term of this patent is extended or adjusted under 35 U.S.C. 154(b) by 0 days.

(21) Appl. No.: 10/733,250

(22) Filed: Dec. 12, 2003

(51) Int. Cl.[7] ............................. A23L 1/00; A47J 37/00
(52) U.S. Cl. ............................ 99/422; 99/339; 99/340; 99/403; 99/408; 99/446; 126/299 R; 126/299 E
(58) Field of Search .................. 99/339, 340, 372–374, 99/403–408, 422–425, 426, 444–450, 516, 536; 126/299 R, 299 D, 299 E, 299 F, 389.1, 39 D, 21 R, 21 A; 55/434, 444, 481, 406, 408, 429, 385.1, DIG. 36; 96/228, 233, 265, 334; 95/53, 26, 150; 454/191

(56) References Cited

U.S. PATENT DOCUMENTS

| | | | | | |
|---|---|---|---|---|---|
| 1,258,084 | A | * | 3/1918 | Bailey | 126/39 D |
| 4,101,299 | A | * | 7/1978 | Bertucci | 96/228 |
| 4,323,373 | A | * | 4/1982 | Fritz | 95/281 |
| 4,724,823 | A | * | 2/1988 | Simpson | 126/39 R |
| 4,878,424 | A | * | 11/1989 | Adamson | 99/340 |
| 4,889,972 | A | * | 12/1989 | Chang | 219/472 |
| 5,069,197 | A | * | 12/1991 | Wisting | 126/299 E |
| 5,413,032 | A | * | 5/1995 | Bruno et al. | 99/331 |
| 5,474,055 | A | * | 12/1995 | Kang | 126/39 R |
| 5,782,172 | A | * | 7/1998 | Schacht | 99/422 |
| 5,884,555 | A | * | 3/1999 | Chang | 99/425 |
| 6,079,407 | A | * | 6/2000 | Lai | 126/299 E |
| 6,138,554 | A | * | 10/2000 | McFadden et al. | 99/422 |

* cited by examiner

*Primary Examiner*—Timothy F. Simone
(74) *Attorney, Agent, or Firm*—Birch, Stewart, Kolasch & Birch, LLP

(57) ABSTRACT

A grill apparatus includes a base having a cooking plate, an exhaust fan mounted in the base for sucking exhaust air generated by the cooking plate, and a water-cooled muffler device mounted in the base and including a housing through which the exhaust air passes. The water-cooled muffler device creates water curtains for filtering, cooling, and muffling the exhaust air. The exhaust air after handling can be directly discharged indoors.

11 Claims, 6 Drawing Sheets

WATER-COOLED MUFFLER DEVICE FOR A GRILL APPARATUS

BACKGROUND OF THE INVENTION

1. Field of the Invention

The present invention relates to a water-cooled muffler device for a grill apparatus. In particular, the present invention relates to a water-cooled muffler device for a grill device for removing smoke generated by the grill device.

2. Description of Related Art

FIG. 6 of the drawings illustrates a grill apparatus with a smoke-removing function. The grill device includes a base 90, a top plate 91, a heater 92, an inlet 93, and a static-electric filtering device 94. The heater 92 using gas as the fuel heats the top plate 91 for cooking purposes. The high-temperature unfiltered exhaust air containing smoke generated as a result of cooking is sucked into the static-electric filtering device 94 via the inlet 93. The smoke that contains oil is filtered by the static-electric filtering device 94 and the filtered exhaust-gas is then discharged to the outside via an exhaust piping.

After a period of time of use of the grill apparatus, the oil stain accumulated in the static-electric filtering device 94 may be the cause of fire, as the flame for heating the top plate 91 may enter the static-electric filtering device 94 via the inlet 93 and inflame the oil stain.

Further, it was found that the static-electric filtering device 94 could neither effectively remove the smoke nor reduce the temperature of the exhaust air. Thus, the exhaust piping is necessary, as the high-temperature filtered exhaust air could not be discharged indoors.

OBJECT OF THE INVENTION

An object of the present invention is to provide a grill apparatus having a water-cooled muffler device for cooling/filtering/muffling the unfiltered exhaust air generated by the grill apparatus. The exhaust air after handling can be directly discharged indoors.

SUMMARY OF THE INVENTION

In accordance with the present invention, a grill apparatus includes a base having a cooking plate, an exhaust fan mounted in the base for sucking exhaust air generated by the cooking plate, and a water-cooled muffler device mounted in the base and including a housing through which the exhaust air passes. The water-cooled muffler device uses water for filtering, cooling, and muffling the exhaust air.

The exhaust fan includes a pipe for guiding the exhaust air into the water-cooled muffler device, and the exhaust fan further includes a guide for guiding the exhaust air in the water-cooled muffler device.

The water-cooled muffler device includes a water pump and means for generating water curtains that are located on paths through which the exhaust air passes. The housing includes an opening in a top thereof. The water-cooled muffler device further includes a ball partially extending through the opening of the housing. A ball-receiving trough is located in a top portion of the housing and receives the ball. A plurality of troughs are located at different levels below the ball-receiving trough. Water in a bottom of the housing is pumped upward into the ball-receiving trough and then falls downward, forming a plurality of water curtains, with the exhaust air passing through the water curtains, through a gap between the ball and the ball-receiving trough, and through another gap between the ball and a periphery delimiting the opening of the housing. The water-cooled muffler device further includes a smoke-removing unit that includes a plurality of vertically spaced plates each having a plurality of apertures. A plurality of water curtains are formed between the troughs and the ball-receiving trough. The exhaust air passes through the apertures of the plates and the water curtains between the troughs and the ball-receiving trough.

An airflow-adjusting device may be provided for adjusting an amount of the exhaust air sucked by the exhaust fan. A static-electric filtering device may be provided for filtering the exhaust air before the exhaust air enters the water-cooled muffler device.

Other objects, advantages and novel features of this invention will become more apparent from the following detailed description when taken in conjunction with the accompanying drawings.

DETAILED DESCRIPTION OF THE PREFERRED EMBODIMENT

A preferred embodiment of the present invention is now to be described hereinafter in detail.

Figure 1:
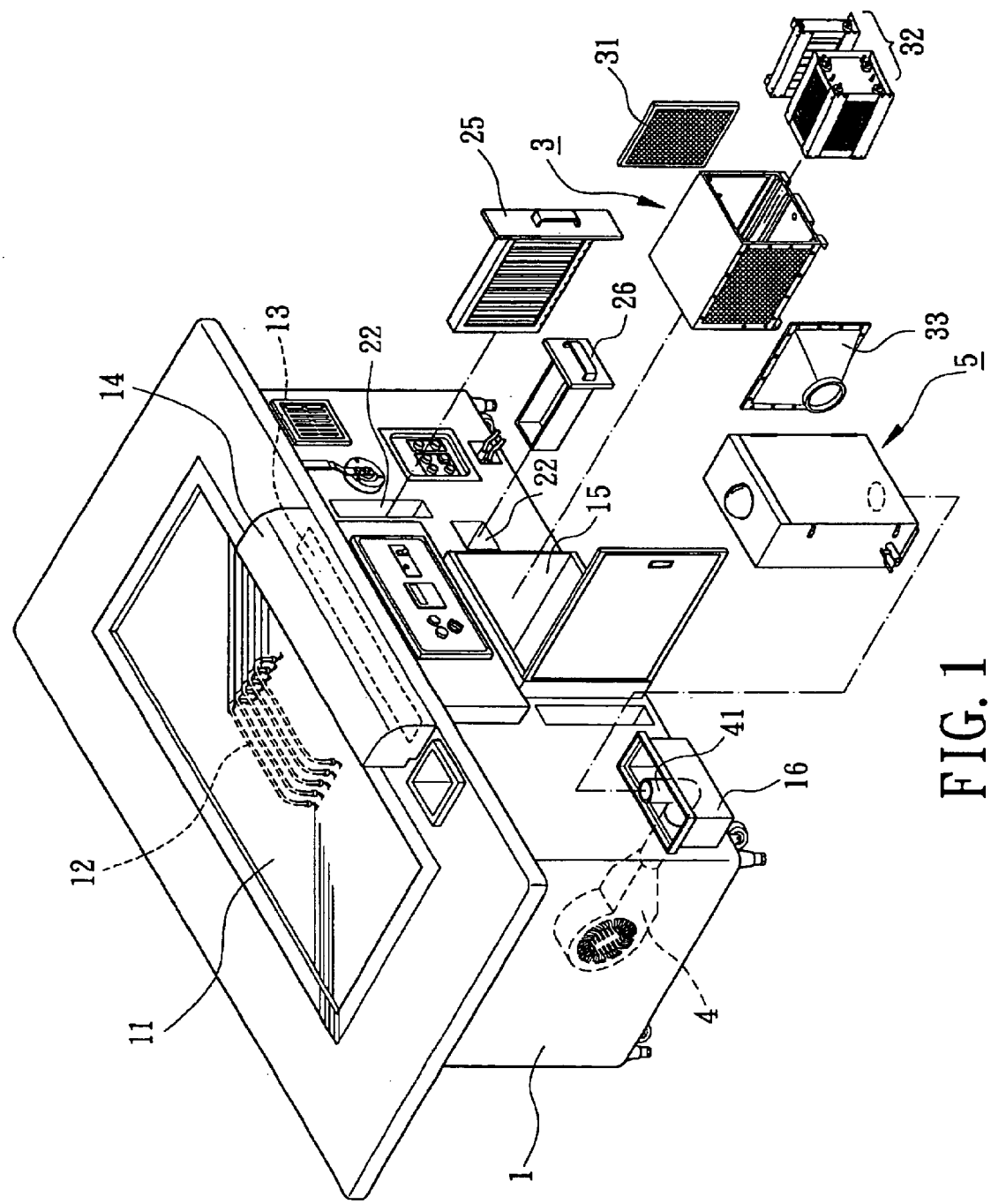
FIG. 1 is an exploded perspective view of a grill apparatus in accordance with the present invention.
Figure 2:
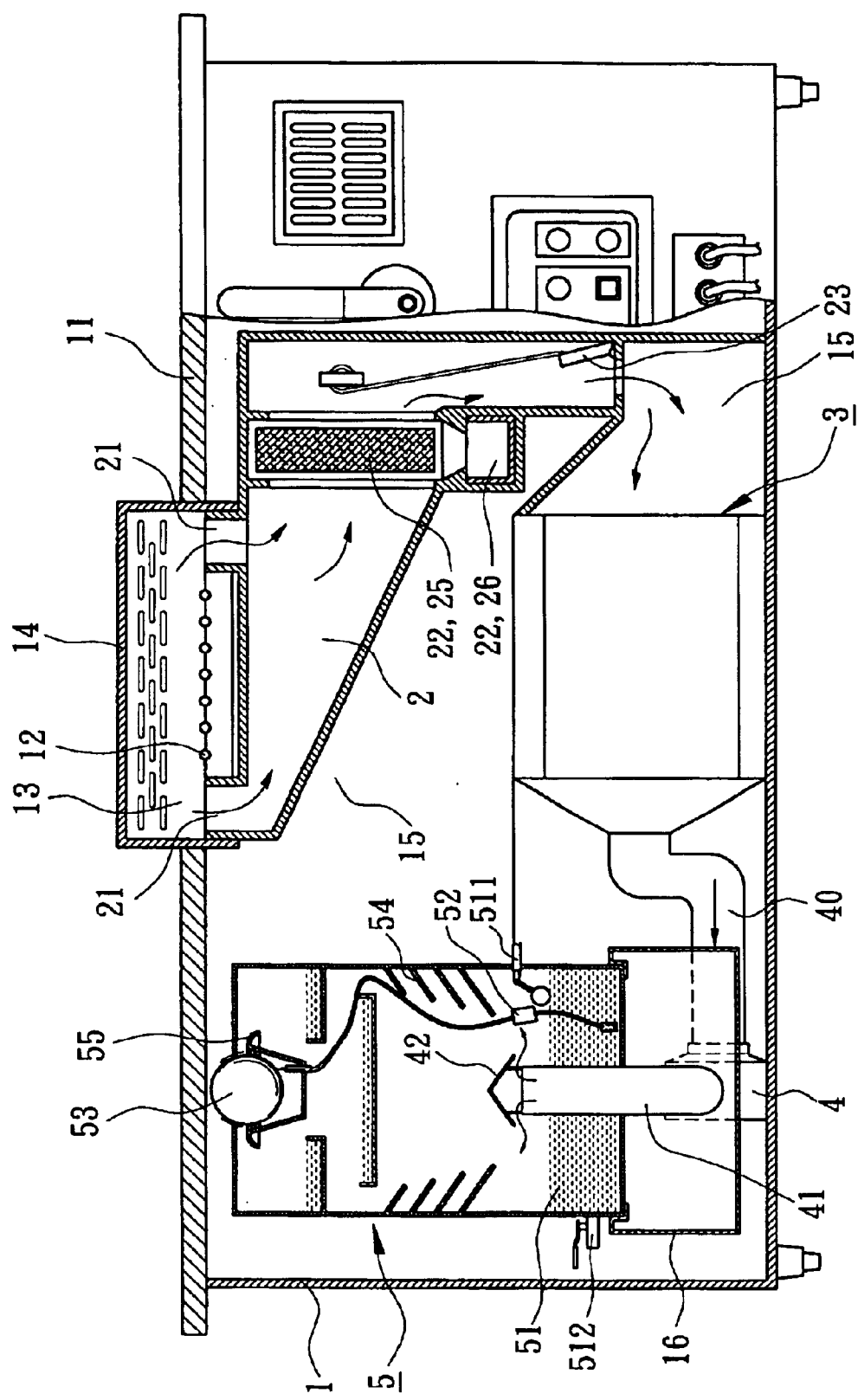
FIG. 2 is a sectional view of the grill apparatus in accordance with the present invention.

Referring to FIGS. 1 and 2, a grill apparatus in accordance with the present invention comprises a base 1, an airflow adjusting device 2, a static-electric filtering device 3, an exhaust fan 4, and a water-cooled muffler device 5.

The base 1 includes a cooking plate 11, an electric heating tube 12, an air inlet 13 defined in a side of the cooking plate 11, a guide 14, and a plurality of chambers 15 for accommodating the airflow adjusting device 2, the static-electric filtering device 3, and the exhaust fan 4. The electric heating tube 12 provides heat energy to the cooking plate 11. The high-temperature exhaust air generated as a result of cooking contains smoke (including oil) and is sucked into the exhaust fan 4 via the air inlet 13 and the airflow adjusting device 2 that controls the amount of unfiltered exhaust air sucked into the exhaust fan 4. The base 1 further includes a mounting member 16 on which the water-cooled muffler device 5 is mounted.

Figure 3:
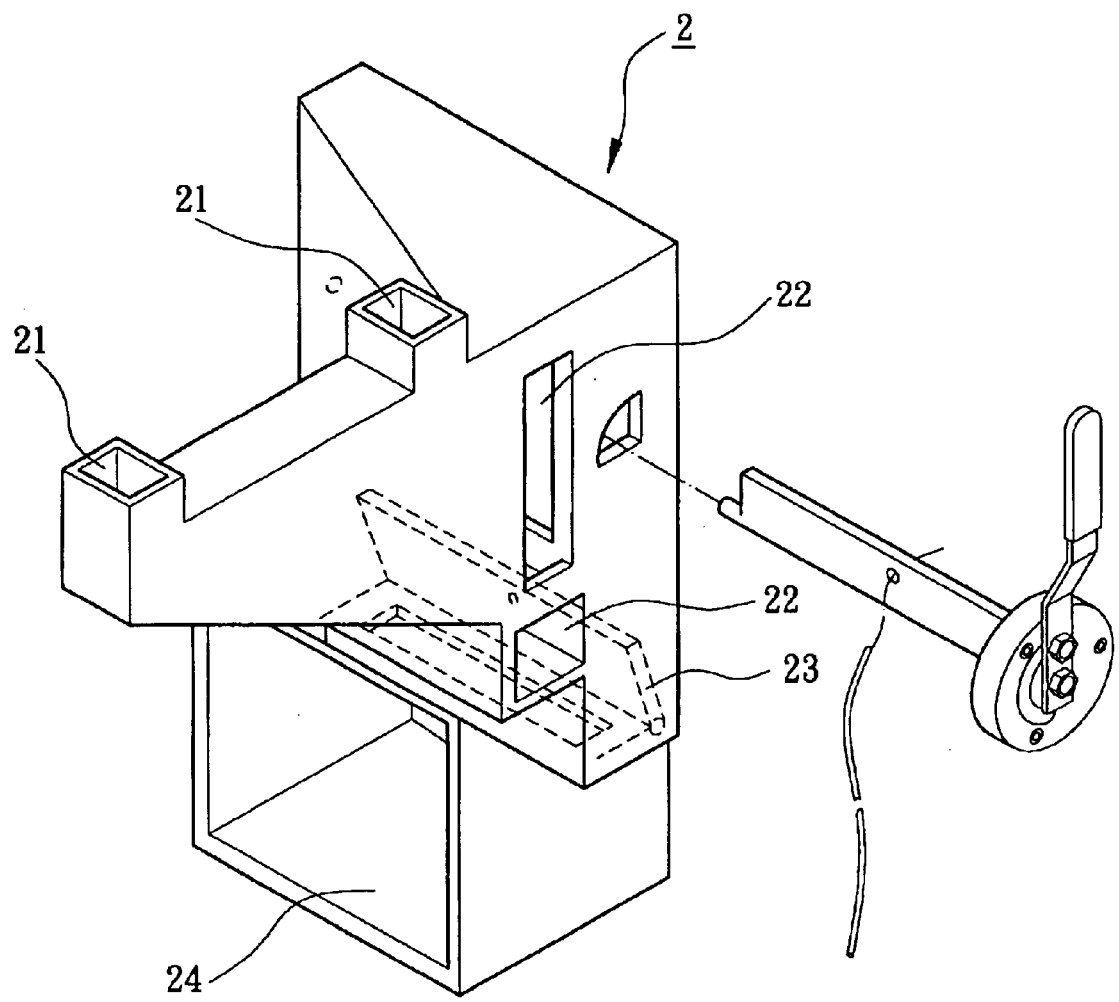
FIG. 3 is an exploded perspective view of an airflow-adjusting device of the grill apparatus in accordance with the present invention.

Referring to FIGS. 1 through 3, the airflow adjusting device 2 is fixed in the base 1 and includes a pair of inlets 21, two mounting holes 22, an adjusting valve 23, and an air outlet 24. The air inlets 21 are communicated with the air inlet 13, allowing unfiltered exhaust air to pass through the adjusting valve 23 and the air outlet 24. A filtering element 25 is removably received in one of the mounting holes 22, and an oil collecting box 26 is removably received in the other mounting hole 22. The adjusting valve 23 controls the amount of the unfiltered exhaust air to be sucked as well as opening/closing of the airflow adjusting device 2. The air outlet 24 is communicated with the static-electric filtering device 3 and the water-cooled muffler device 5.

As illustrated in FIGS. 1 and 2, the static-electric filtering device 3 includes a filtering member 31, a static-electric dust-collecting box 32, and a guide 33. The smoke contained in the unfiltered exhaust air is preliminarily filtered by the filtering member 31 and the static-electric dust-collecting box 32, and the preliminarily filtered exhaust air is guided by the guide 33 to the water-cooled muffler device 5.

As illustrated in FIGS. 1 through 3, the exhaust fan 4 is mounted in the base 1 for driving the high-temperature exhaust air via the air inlet 13. The exhaust fan 4 includes two pipes 40 and 41 that are communicated with each other. Further, the pipes 40 and 41 are respectively communicated with the static-electric filtering device 3 and the water-cooled muffler device 5. A guide 42 is mounted to an end of the pipe 41 located in the water-cooled muffler device 5 for guiding the preliminarily filtered exhaust air entering the water-cooled muffler device 5 for subsequent cooling, filtering, and muffling.

Figure 4:
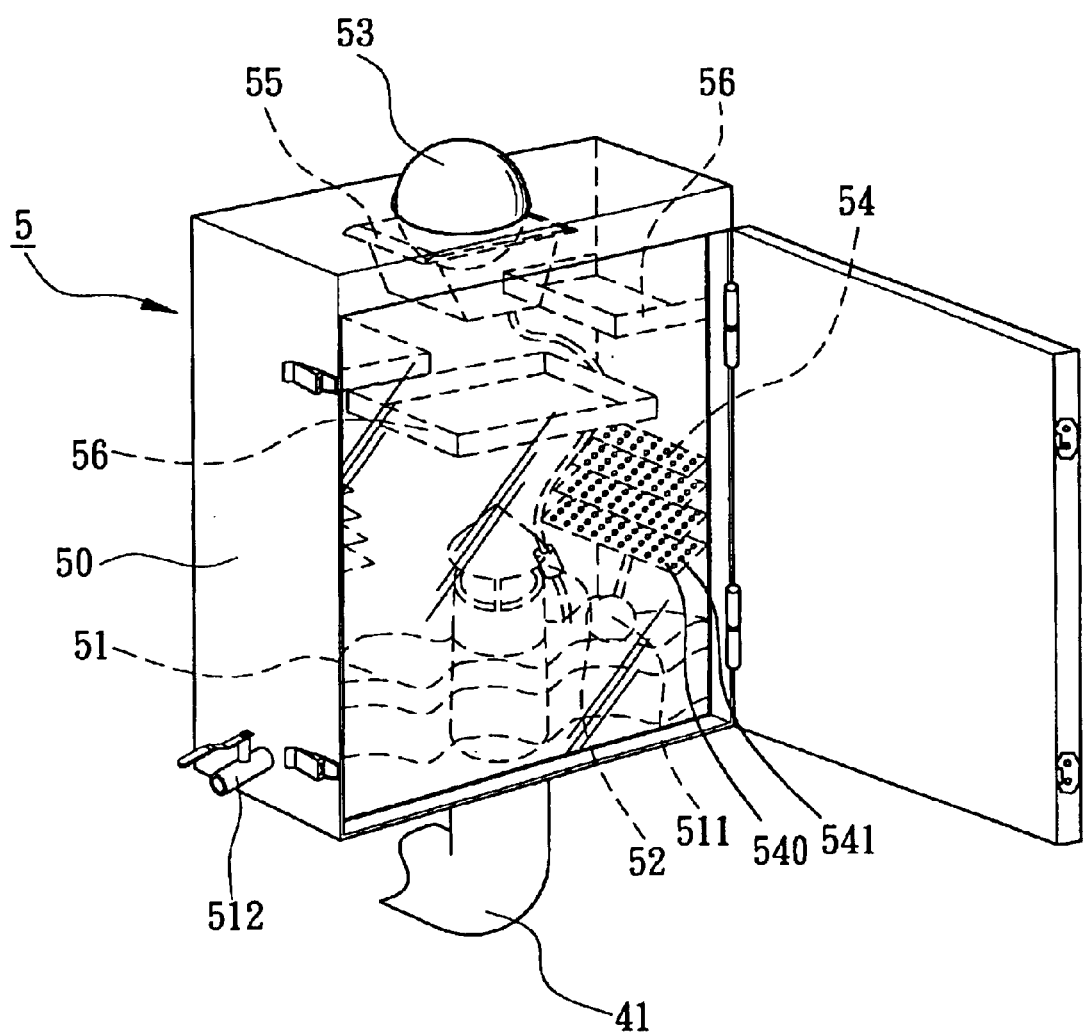
FIG. 4 is a perspective view of a water-cooled muffler device.
Figure 5:
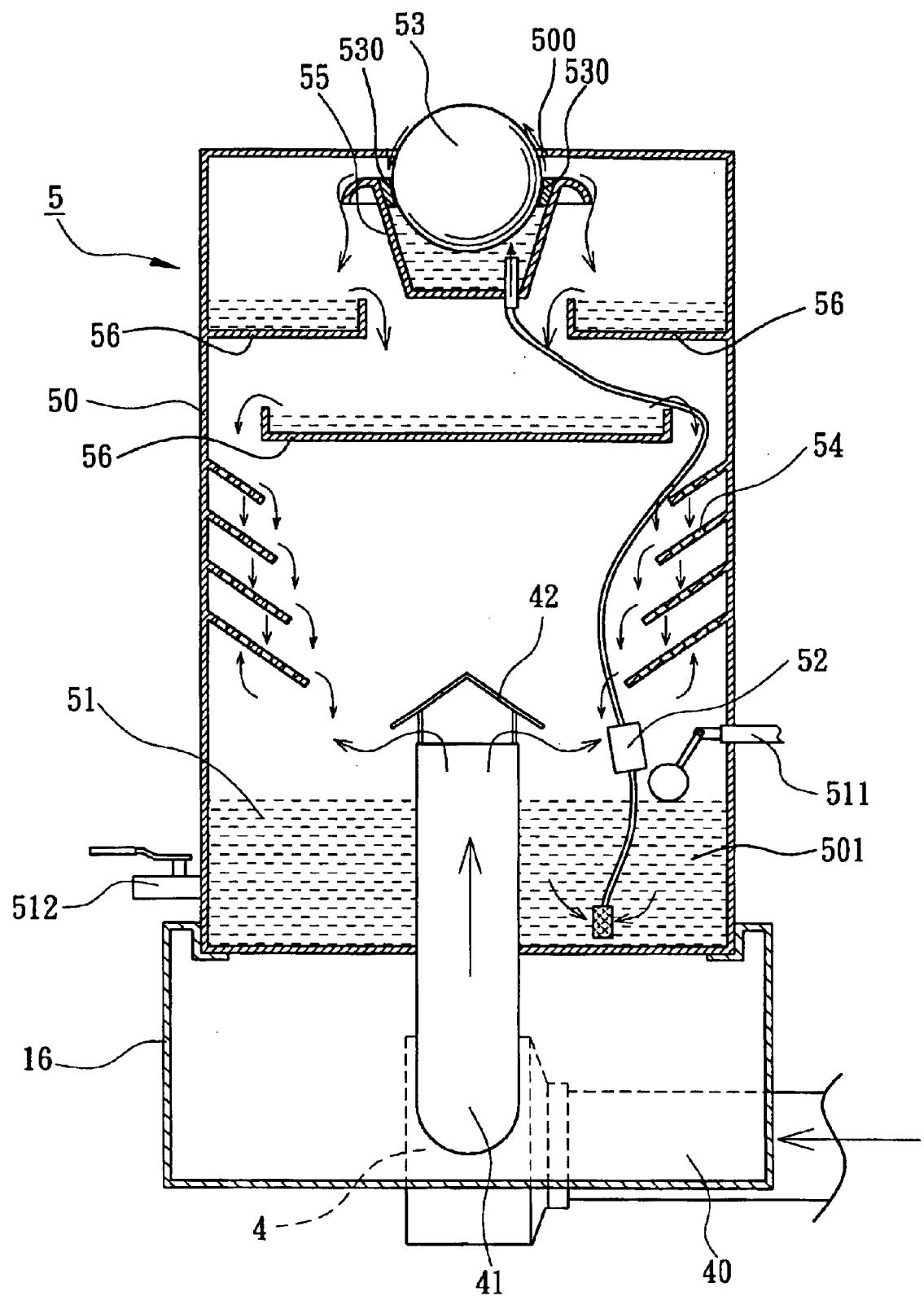
FIG. 5 is an enlarged sectional view illustrating operation of the water-cooled muffler device of the grill apparatus in accordance with the present invention.
Figure 6:
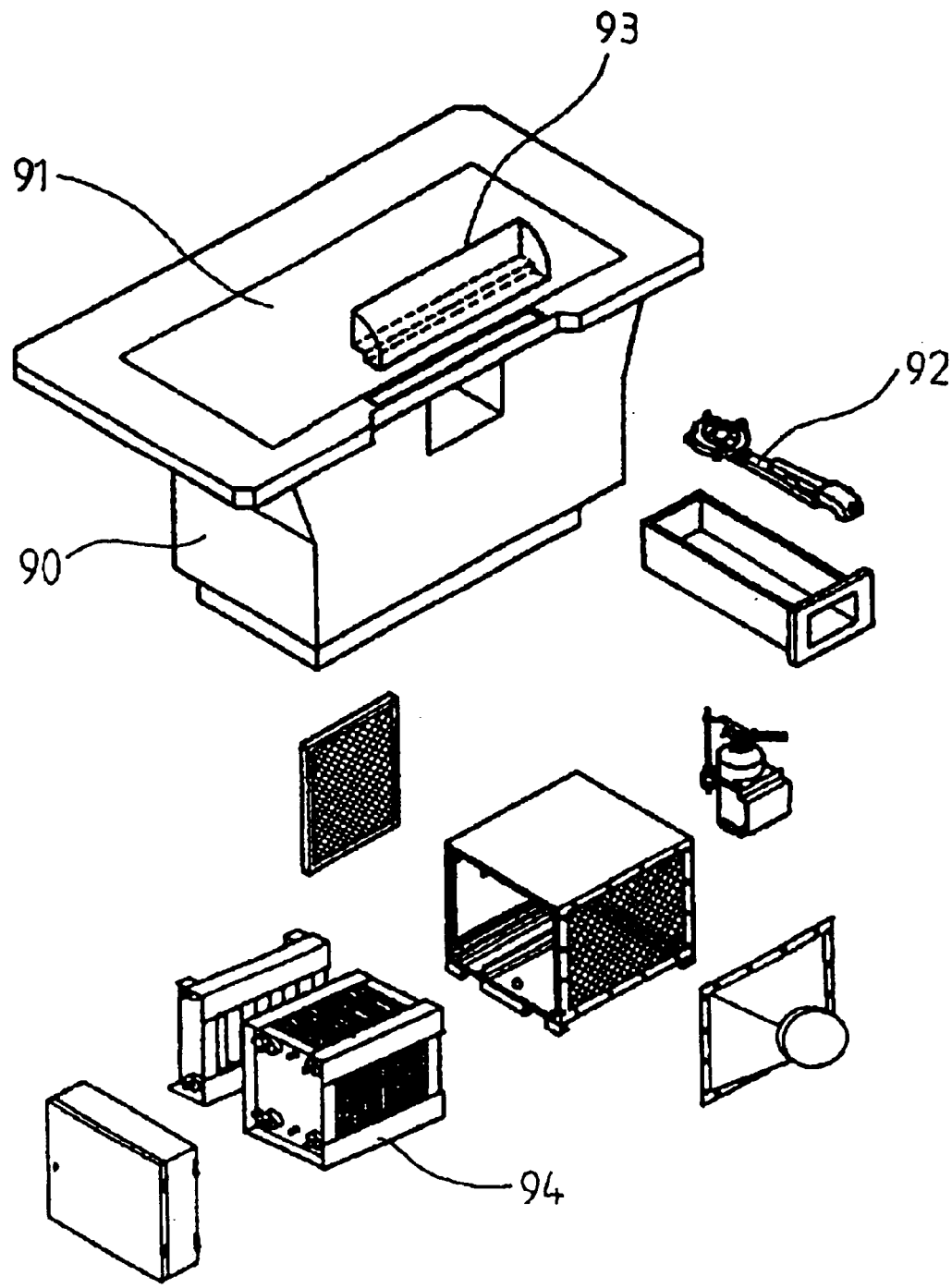
FIG. 6 is an exploded perspective view of a conventional grill apparatus.

Referring to FIGS. 2, 4, and 5, the water-cooled muffler device 5 includes a housing 50 in which a water-circulating system 51, a water pump 52, a ball 53, a smoke removing unit 54, and a ball-receiving trough 55 are accommodated. Further, the housing 50 has a bottom portion acting as a reservoir 501. The pipe 41 extends into the housing 50 and has an end located above the reservoir 501. The guide 42 is mounted to the end of the pipe 41 located in the housing 50 for guiding the preliminarily filtered exhaust air entering the water-cooled muffler device 5 for subsequent cooling, filtering, and muffling. The water-circulating system 51 includes a water inlet tube 511 and a water outlet tube 512. As illustrated in FIG. 5, the ball 53 is mounted to a top portion of the housing 50 and partially extends through an opening 500 in the top of the housing 50. The preliminarily filtered exhaust air guided by the guide 42 into the housing 50 flows upward and passes through the smoke removing unit 54.

Fresh water is supplied to the reservoir 501 via the water inlet tube 511 for removing smoke, and the exhaust water containing smoke is discharged via the water outlet tube 512.

The water pump 52 delivers water to the water-cooled muffler device for proceeding with cooling, filtering, and muffling of the preliminarily filtered exhaust air. More specifically, water in the reservoir 501 of the housing 50 is pumped by the water pump 52 into the ball-receiving trough 55 and moves the ball 53 upward. The water stream causes rotation of the ball 53 and forms water curtains that fall downward by gravity. The water of the water curtains flows through the smoke removing unit 54 and encounters the preliminarily filtered exhaust air. The smoke (including oil) contained in the preliminarily filtered exhaust air is removed, and the temperature of the preliminarily exhaust air is reduced. The exhaust air exits the water-cooled muffler device 5 via a gap 530 between the ball 53 and the ball-receiving trough 55 and a gap between the ball 53 and a periphery delimiting the opening 500 of the housing 50. Thus, the exhaust air can be directly discharged indoors after passing through the water-cooled muffler device 5.

As illustrated in FIGS. 2, 4, and 5, the smoke-removing unit 54 includes two rows of vertically spaced plates 540 each having a plurality of apertures 541 through which the preliminarily filtered exhaust air and the water of the water curtains flows. It is noted that water curtains also exist between the plates 540. The time for filtering and cooling the preliminarily filtered exhaust air is increased. Thus, the filtering efficiency and the cooling efficiency are both improved. Preferably, the apertures 541 of a lower plate 540 are not aligned with the apertures 541 of an upper plate 540. This further increases the time for proceeding filtration and cooling. The filtering efficiency and the cooling efficiency are thus further improved.

To form the water curtains above the plates 540, a plurality of troughs 56 are fixed inside the housing 50 and located at different levels above the plates 540. Thus, when the preliminarily exhaust air passes the water curtains above the plates 540, the smoke (including oil) in the preliminarily filtered exhaust air that has passed through the plates 540 is further filtered. The preliminarily filtered exhaust air is further cooled and muffled. The smoke-removing efficiency, the cooling efficiency, and the muffling effect are further improved. The exhaust air after handling can be directly discharged outside the housing 50. Namely, the exhaust air passing through the housing 50 can be directly discharged indoors.

While the principles of this invention have been disclosed in connection with a specific embodiment, it should be understood by those skilled in the art that these descriptions are not intended to limit the scope of the invention, and that any modification and variation without departing the spirit of the invention is intended to be covered by the scope of this invention defined only by the appended claims.

What is claimed is:

1. A grill apparatus comprising:
   a base having a cooking plate;
   an exhaust fan mounted in the base for sucking exhaust air generated by the cooking plate; and
   a water-cooled muffler device mounted in the base and including a housing through which the exhaust air passes, the water-cooled muffler device using water for filtering, cooling, and muffling the exhaust air.

2. The grill apparatus as claimed in claim 1, with the exhaust fan including a pipe for guiding the exhaust air into the water-cooled muffler device, the exhaust fan further including a guide for guiding the exhaust air in the water-cooled muffler device.

3. The grill apparatus as claimed in claim 1, with the water-cooled muffler device including a water-circulating system having a water inlet tube and a water outlet tube.

4. The grill apparatus as claimed in claim 1, with the water-cooled muffler device including a water pump and means for generating water curtains that are located on paths through which the exhaust air passes.

5. The grill apparatus as claimed in claim 4, with the housing including an opening in a top thereof, the water-cooled muffler device further including a ball partially extending through the opening of the housing, a ball-receiving trough being located in a top portion of the housing, with the ball being received in the ball-receiving trough, and with a plurality of troughs being located at different levels below the ball-receiving trough.

6. The grill apparatus as claimed in claim 5, with water in a bottom of the housing being pumped upward into the ball-receiving trough and then falling downward, forming a plurality of water curtains, with the exhaust air passing through the water curtains, through a gap between the ball and the ball-receiving trough, and through another gap between the ball and a periphery delimiting the opening of the housing.

7. The grill apparatus as claimed in claim 6, with the water-cooled muffler device including a smoke-removing unit that includes a plurality of vertically spaced plates each having a plurality of apertures, with a plurality of water curtains being formed between the troughs and the ball-receiving trough, and with the exhaust air passing through the apertures of the plates and the water curtains between the troughs and the ball-receiving trough.

8. The grill apparatus as claimed in claim 1, with the water-cooled muffler device including a smoke-removing unit that includes a plurality of vertically spaced plates each having a plurality of apertures, with the water and the exhaust air passing through the apertures of the plates.

9. The grill apparatus as claimed in claim 8, with the water passing through the apertures of the vertically spaced plates and forming a plurality of water curtains.

10. The grill apparatus as claimed in claim 1, further including an airflow adjusting device for adjusting an amount of the exhaust air sucked by the exhaust fan.

11. The grill apparatus as claimed in claim 1, further including a static-electric filtering device for filtering the exhaust air before the exhaust air enters the water-cooled muffler device.

\* \* \* \* \*